US011185389B2

(12) United States Patent
Williams et al.

(10) Patent No.: US 11,185,389 B2
(45) Date of Patent: Nov. 30, 2021

(54) DENTAL FLOW CONTROL ADJUSTER WITH OPERATION INDICATOR

(71) Applicant: A-dec, Inc., Newberg, OR (US)

(72) Inventors: Ryan M. Williams, Sherwood, OR (US); Kohler Johnson, Dundee, OR (US); Jason Alvarez, Portland, OR (US)

(73) Assignee: A-dec, Inc., Newberg, OR (US)

( * ) Notice: Subject to any disclaimer, the term of this patent is extended or adjusted under 35 U.S.C. 154(b) by 77 days.

(21) Appl. No.: 16/387,160

(22) Filed: Apr. 17, 2019

(65) Prior Publication Data

US 2020/0330182 A1 Oct. 22, 2020

(51) Int. Cl.
*A61C 1/00* (2006.01)
*A61C 17/02* (2006.01)

(52) U.S. Cl.
CPC .......... *A61C 1/0061* (2013.01); *A61C 1/0038* (2013.01); *A61C 17/0202* (2013.01); *A61C 17/0217* (2013.01)

(58) Field of Classification Search
CPC ............ A61C 17/0202; A61C 17/0217; A61C 1/00–0092; A61G 15/00; A61G 15/14; A61G 15/16; A61G 15/10; A61M 5/16877; A61M 5/16881; A61M 5/16886; A61M 15/0071
See application file for complete search history.

(56) References Cited

U.S. PATENT DOCUMENTS

| 3,691,634 | A | | 9/1972 | Buchtel et al. | |
| 4,106,198 | A | * | 8/1978 | Childress | A61C 1/0015 433/101 |
| 4,430,062 | A | * | 2/1984 | Henrichsen | A61C 1/0038 433/28 |
| 5,107,899 | A | * | 4/1992 | Murphy | A61C 1/0038 137/884 |
| 6,152,735 | A | * | 11/2000 | Meyer | A61G 15/16 433/108 |

(Continued)

FOREIGN PATENT DOCUMENTS

| EP | 2653785 | 12/2017 |
| WO | WO98/44861 | 10/1998 |

OTHER PUBLICATIONS

International Search Report and Written Opinion for PCT/US2020/028578, dated Sep. 10, 2020.

*Primary Examiner* — Yogesh P Patel
(74) *Attorney, Agent, or Firm* — Klarquist Sparkman, LLP

(57) ABSTRACT

A dental delivery system can comprise a first fluid conduit for supplying fluid via the delivery system to a handpiece connected to a distal end of the conduit, a plurality of flow control adjusters positioned on the delivery system at a location remote from the at least one fluid conduit, and an indicator circuit comprising a plurality of sensors and a plurality of indicators corresponding to the plurality of flow control adjusters. A first flow control adjuster of the plurality of flow control adjusters can be operable to change a fluid flow rate in the first fluid conduit. A first sensor of the plurality of sensors can be operable to trigger a first indicator of the plurality of indicators in response to predetermined motion of the first fluid conduit to indicate that the first flow control adjuster is associated with the first fluid conduit.

9 Claims, 10 Drawing Sheets

(56) References Cited

U.S. PATENT DOCUMENTS

| | | | |
|---|---|---|---|
| 6,261,219 B1 * | 7/2001 | Meloul | A61N 5/1002 600/3 |
| 6,358,048 B1 * | 3/2002 | Peralta | A61C 1/0061 433/28 |
| 6,390,815 B1 * | 5/2002 | Pond | A61C 1/0061 433/100 |
| 6,627,829 B2 | 9/2003 | Sato | |
| 6,692,253 B2 * | 2/2004 | Brockway | A61G 15/16 312/209 |
| 2007/0148615 A1 * | 6/2007 | Pond | A61C 17/20 433/80 |
| 2010/0199203 A1 * | 8/2010 | Bauer | A61C 1/0023 715/771 |
| 2018/0259190 A1 | 9/2018 | Furuti et al. | |
| 2019/0070055 A1 | 3/2019 | Sato et al. | |

* cited by examiner

DENTAL FLOW CONTROL ADJUSTER WITH OPERATION INDICATOR

FIELD

The present disclosure pertains to indicators for flow control adjusters in dental delivery systems.

BACKGROUND

Dental delivery systems typically include control heads or delivery units for supplying utilities such as compressed air, water, electrical power, etc., to dental instruments. Such delivery units typically include a housing to which a plurality of conduits may be coupled to interconnect various dental instruments with the delivery unit. Such delivery units may be in the "traditional" style, in which conduits extend from the delivery unit without a guide, or a "continental" style, in which guides known as "whips" extend from the delivery unit and may be configured to flex to aid in positioning the conduits.

The dental delivery system has multiple control knobs to adjust flow rates of air or water through the conduits and to the various dental instruments. In some delivery systems, the control knobs can be remote from the locations from which the instruments are accessed such that it is not always clear which control knob is associated with which dental instrument. This can cause a practitioner to either use the wrong control knob when attempting to adjust a flow rate for a particular instrument or to avoid using the control knobs altogether because they are unsure which control knob to use. Accordingly, there exists a need for an improved delivery system that can indicate an association between a control knob and a dental instrument.

SUMMARY

Described below are implementations of a dental delivery system with adjusters and operation indicators to indicate an adjuster associated with a particular dental instrument currently in use.

In one representative embodiment, a dental delivery system can comprise at least a first fluid conduit for supplying fluid via the delivery system to a handpiece connected to a distal end of the conduit, a plurality of flow control adjusters positioned on the delivery system at a location remote from the at least one fluid conduit, and an indicator circuit comprising a plurality of sensors and a plurality of indicators corresponding to the plurality of flow control adjusters. A first flow control adjuster of the plurality of flow control adjusters can be operable to change a fluid flow rate in the first fluid conduit. A first sensor of the plurality of sensors is operable to trigger a first indicator of the plurality of indicators in response to predetermined motion of the first fluid conduit to indicate that the first flow control adjuster is associated with the first fluid conduit.

In some embodiments, the plurality of flow control adjusters can comprise a plurality of rotatable knobs.

In some embodiments, the system can further comprise at least one holding area to hold a handpiece. In these embodiments, the first sensor can be operable to trigger the first indicator in response to a handpiece being removed from a holding area.

In some embodiments, the system can further comprise at least one whip arm. In these embodiments, the first sensor can be operable to trigger the first indicator in response to the whip arm being pivoted from an at rest position.

In some embodiments, the first sensor can comprise a handpiece holder valve. In some embodiments, the handpiece holder valve can comprise a pneumatic valve. In some embodiments, the handpiece holder valve can further comprise a latch that is configured to move in response to the predetermined motion of the first fluid conduit and close the valve. In some embodiments, the indicator circuit can further comprise a pressure transducer to receive a pneumatic signal from the pneumatic valve.

In another representative embodiment, a dental delivery system can comprise an array of flow control adjusters, a plurality of indicator lights, and a plurality of holding areas. At least one of the flow control adjusters can be configured to control a fluid flow rate through a handpiece coupled to the delivery device. At least one indicator light can be associated with at least one of the flow control adjusters. At least one holding area can be associated with one of the flow control adjusters and can be configured to hold a handpiece. When a handpiece is removed from one of the holding areas, the indicator light associated with the flow control adjuster associated with the holding area can be illuminated.

In some embodiments, the plurality of holding areas and the plurality of flow control adjusters can be at dispersed locations relative to each other. In some embodiments, at least one of the holding areas can comprise a handpiece holder valve to detect when a handpiece is removed from the holding area. In some embodiments, the handpiece holder valve can comprise a pneumatic valve.

In some embodiments, the handpiece holder valve can further comprise a latch. In these embodiments, when the handpiece is removed from the holding area, the latch can extend into the holding area and open the pneumatic valve. When the handpiece is placed in the holding area, the latch can be moved by the handpiece to close the pneumatic valve.

In some embodiments, the system can further comprise a control board configured to control the illumination of the indicator lights. In these embodiments, the handpiece holder valve can cause a signal to be sent to the control board to illuminate the associated indicator light when a handpiece is removed from the holding area.

In another representative embodiment, a dental delivery system can comprise a plurality of whip arms, a plurality of flow control adjusters, and a plurality of indicator lights. At least a first whip arm can be configured with a conduit for coupling to a handpiece. At least a first flow control adjuster can be configured to control a fluid flow rate through a conduit of the whip arm. At least a first indicator light can be associated with the first flow control adjuster. When the first whip arm is pivoted from a resting position, the first indicator light associated with the first flow control adjuster can be illuminated.

In some embodiments, the plurality of whip arms and the plurality of flow control adjusters can be at dispersed locations relative to each other. In some embodiments, at least one of the whip arms can comprise a handpiece holder valve to detect when the whip arm is pivoted from the resting position.

In some embodiments, the handpiece holder valve can comprise a pneumatic valve. In some embodiments, air pressure can be applied to the pneumatic valve and the pneumatic valve can be configured to open when the whip arm is pivoted from the resting position.

In some embodiments, the delivery system can further comprise a control board to control the illumination of the indicator lights. In these embodiments, the handpiece holder valve can cause a signal to be sent to the control board to illuminate the associated indicator light when the whip arm is pivoted form the resting position.

The foregoing and other objects, features, and advantages of the invention will become more apparent from the following detailed description, which proceeds with reference to the accompanying figures.

DETAILED DESCRIPTION

Described below are representative embodiments of a dental delivery system for dental instruments that includes flow control adjusters, such as flow control knobs, to control fluid flow rates through the dental instruments and indicators, such as lights, to show an association between a particular dental instrument currently in use and its corresponding flow control adjuster.

Figure 10:
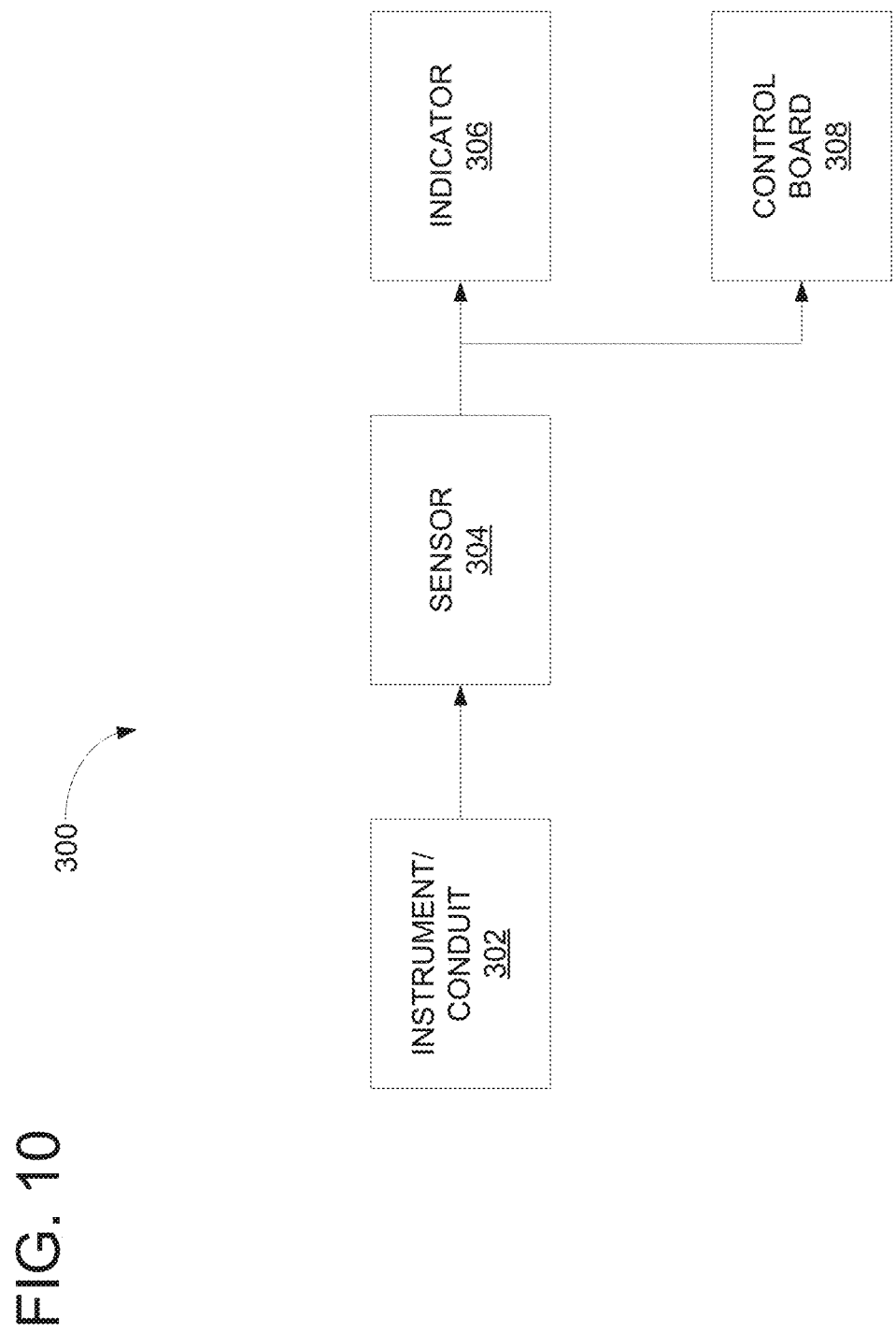
FIG. 10 shows a block diagram of a dental delivery system according to embodiments disclosed herein.

For example, FIG. 10 shows a block diagram of key components of a dental delivery system 300 to illustrate logical and functional relationships between key components at a high level. The delivery system 300 can include a fluid flow conduit 302, a sensor 304, an indicator 306, and a control board or control block assembly 308.

A dental instrument or other device (also referred to herein collectively as handpieces) can be connected to the distal end of the conduit 302. Fluid, such as coolant water or coolant solution for a rotary cutting handpiece, can be supplied to the handpiece via the conduit 302. The delivery system can include a flow control adjuster to adjust the flow rate of fluid through the conduit 302 and a connected handpiece. The sensor 304 can determine when the handpiece is in use, such as by sensing a predetermined motion of the instrument or the conduit 302. The sensor 304 is linked to the indicator 306, which can be illuminated to indicate which of a plurality of flow control adjusters can be used to adjust flow rate for the handpiece that is being used. Depending on the particular handpiece being used, the flow control adjuster can adjust the flow rate of air, water, or other fluids. The delivery system 300 is particularly well suited for adjusting the flow of water or other liquids since different flow rates of water or liquid are often desirable with different handpieces connected to the delivery system. As shown, the sensor 304 is linked to the indicator 306, and thus can transmit a signal, such as a fluid signal, digital signal, or other type of signal to the indicator 306. The sensor 304 can also be linked to control board 308, which can control other operations of the delivery system 300.

Figure 1:
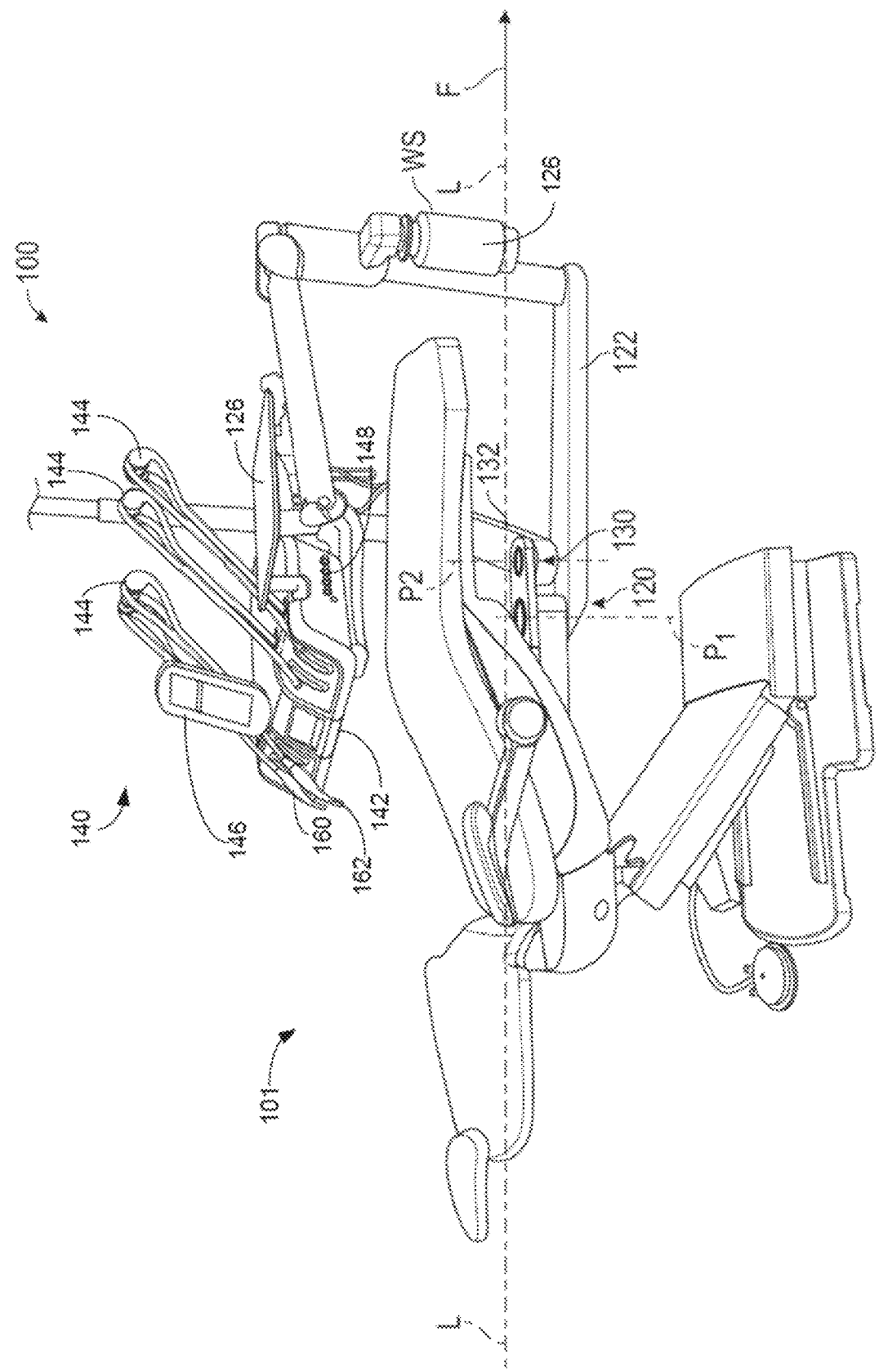
FIG. 1 is a perspective view of a dental treatment assembly, according to one embodiment.

FIG. 1 is a perspective view of one example of a dental chair assembly 100 having a dental chair 101, with which a delivery system, such as delivery system 140, is typically used. The dental chair assembly 101, which is sometimes also referred to as a patient chair or a treatment chair, is designed to accommodate a patient (not shown) comfortably, while allowing the patient to be positioned as needed relative to a dentist or other practitioner(s) during treatment The dental chair assembly 100 further includes a first movable arm 122 that can pivot or rotate (i.e., to the left or to the right) with respect to a first pivot mount 120 about a first upright pivot axis $P_1$. There is also a second pivot mount 130 positioned on the longitudinal axis L and forward of the first pivot mount 120 that supports a second movable arm 132. The second movable arm 132 can pivot or rotate with respect to the second pivot mount 130 about a second upright pivot axis $P_2$.

The first movable arm 122 can be configured to support a delivery system, such as the continental delivery system 140 shown in FIG. 1, a traditional delivery system, or another type of delivery system. The continental and traditional delivery systems are described in more detail below. The first movable arm 122 can also support various other equipment, such as a water supply container 124 or a tray 126. In the illustrated implementation, the first movable arm 122 is configured to have an adjustable height section that allows equipment attached at the distal end, such as the delivery system 140, to be raised and lowered, swung through an arc and retained in place at a desired location (such as, e.g., with a brake or other device) with ease. The second movable arm 132 can be configured to support other equipment, such as a dental light (not shown). Other alternative configurations are also possible, depending upon the particular operating requirements.

The delivery system 140 refers to the device or devices that provide the necessary utilities and amenities to provide treatment to the patient (including but not limited to compressed air, water, suction, electricity, data, touch or other control for integrated devices, holders for instruments and other components, etc.). The delivery system 140 can include a control head 142 to provide handpieces at positions convenient for treatment and is movable, e.g., to provide space for ingress and egress from the chair assembly 101. The control head 142 can provide connections for one or more of liquid (e.g., water), compressed air, suction, electrical power, data, etc., various instruments and devices that use these connections, storage for the instruments and devices, and/or a display, among other components.

Referring to FIG. 1, the delivery system 140 shown is a continental style delivery system. The delivery system 140 includes a plurality of whip arms 144 that can be coupled to handpieces for use during a dental procedure (e.g., drills, polishers, etc.). Each of the whip arms 144 can be connected to a supply of air, liquid, or other media for operation of a particular handpiece to be coupled to the whip arm.

Figure 2:
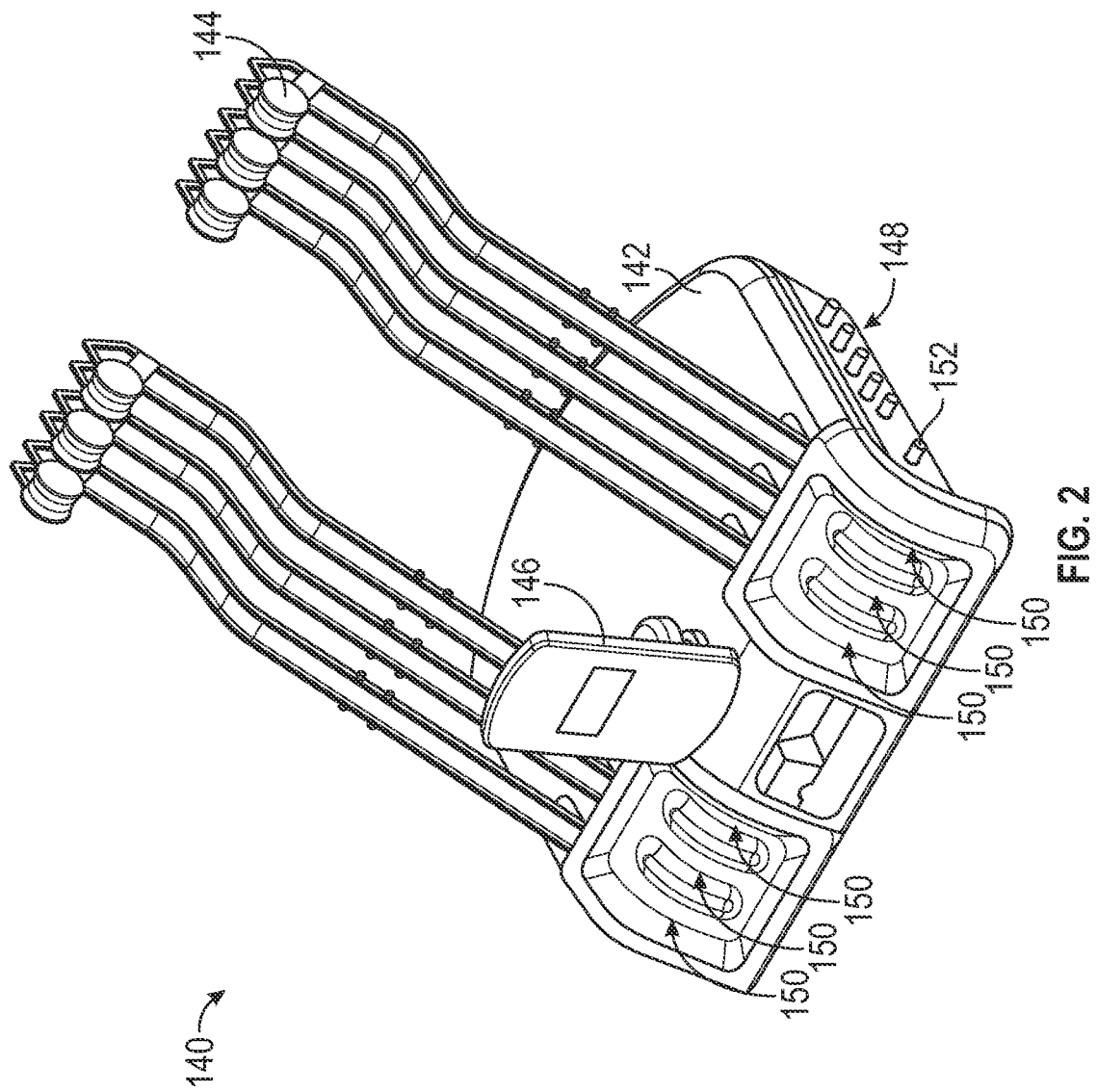
FIG. 2 shows a perspective view of the continental dental unit of FIG. 1.

FIG. 2 is a perspective view of the delivery system 140 adapted to have six whip arms 144. As shown in FIG. 2, the control head 142 can include a plurality of holding areas 150 (such as six areas as shown) that are shaped to receive handpieces, such as handpieces 160, 162, when they are not in use.

Figure 3:
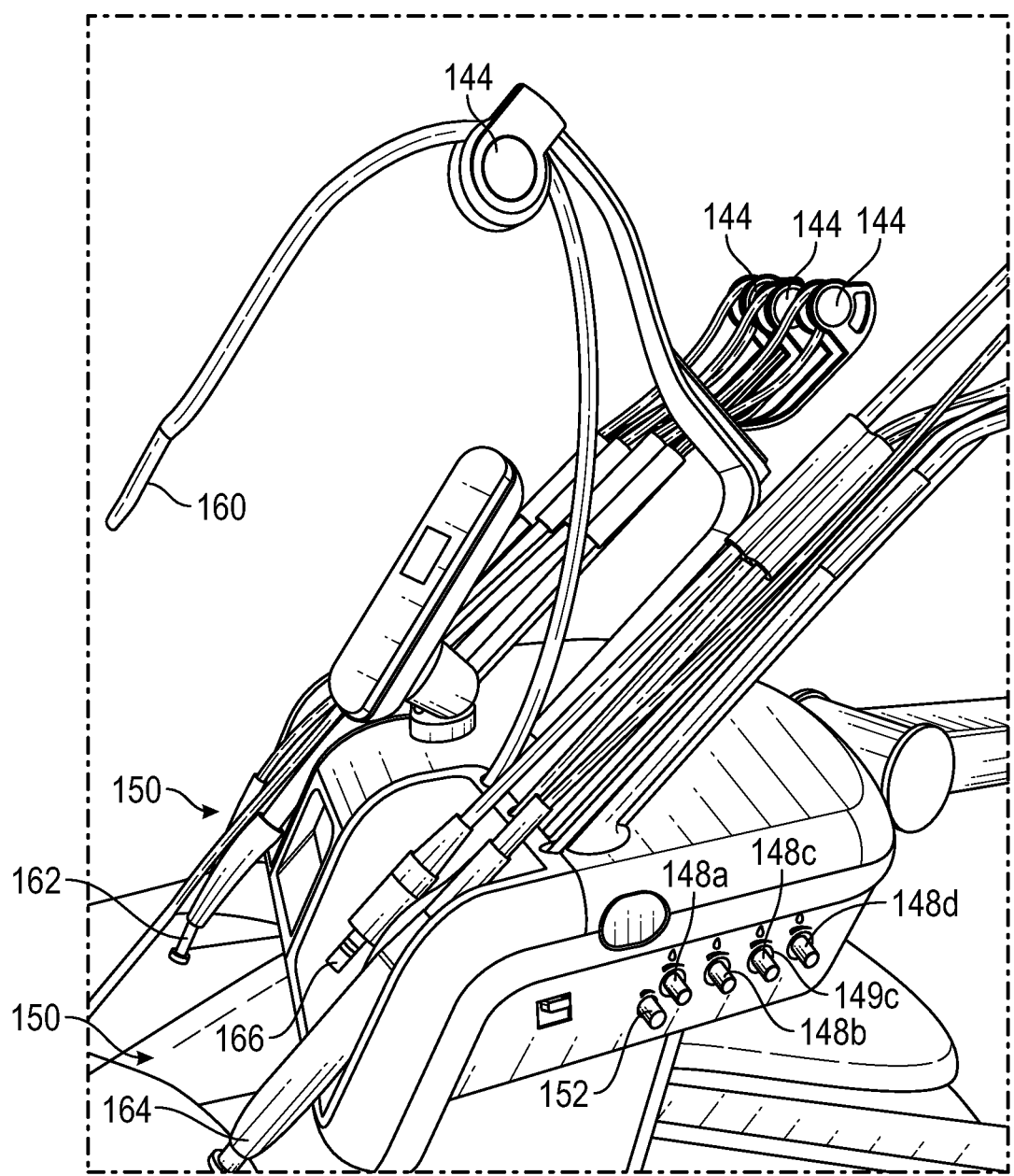
FIG. 3 shows a perspective view of the continental dental unit of FIG. 1 in use.

Referring to FIG. 3, a handpiece 160 is shown in use with its whip arm 144 pulled away from its at rest position and handpieces 162, 164 are shown with their whip arms 144 in their at rest positions in holding areas 150. Also, there is a connection 166 for a handpiece shown in an at rest position. As a handpiece is removed from a holding area 150 and pulled away from the control head 142 during a dental procedure, the whip arm 144 can pivot away from the at rest position as shown for the whip arm for the handpiece 160. This allows a practitioner to have freedom of movement while using a handpiece during a procedure. When the whip arm 144 is not in the at rest position, it applies a gentle tugging force to a handpiece coupled to it. This force is not significant enough to interfere with the use of the handpiece during a procedure. However, as pressure is removed from the handpiece by the practitioner, this tugging force retracts the whip arm 144 to pivot back to the resting position such that the handpiece can be placed back into its holding area 150. In some embodiments, the whip arm 144 does not apply a tugging force while the practitioner is using the handpiece. In these embodiments, when the practitioner intends to return the handpiece to its holding area, a retracting force acting on the whip can be triggered either actively by the practitioner (e.g., by quickly tugging the handpiece) or passively (e.g., after operation of the handpiece ceases).

In the illustrated embodiment, the control head 142 includes a plurality of flow control adjusters 148. In particular embodiments, the flow control adjusters 148 are rotatable knobs. In other embodiments, the flow control adjusters 148 can be sliders or other types of adjusters. The flow control adjusters 148 can be used to control fluid flow rates to the various handpieces coupled to the whip arms 144. The control head 142 can also include an air flow control adjuster or air flow control knob 152, as best shown in FIG. 2, to control air flow, such as coolant air for a rotary cutting handpiece, to one or more handpieces coupled to one or more whip arms 144.

In the illustrated embodiment, the delivery system 140 includes six whip arms 144 (see FIG. 2), four flow control adjusters 148a-d and one air flow control adjuster 152. Each of the four flow control adjusters 148a-d can be associated with one whip arm 144 to control fluid flow through a handpiece coupled to that whip arm. Additionally, the air flow control adjuster 152 can control air flow through any or all of the handpieces coupled to the whip arms 144, including any or all of the handpieces associated with the flow control adjusters 148. In other embodiments, the delivery system 140 can include more or fewer than six whip arms 144, more or fewer than four flow control adjusters 148, and more or fewer than one air flow control adjuster 152. Because there are six whip arms 144 and only four knobs 148a-d in the embodiment depicted in FIG. 2, not all whip arms are associated with a flow control adjuster. In some embodiments, each whip arm 144 can be associated with a flow control adjuster.

As shown in FIG. 3 (and also in FIG. 1), the whip arms 144 and the knobs 148a-d are at dispersed locations relative to each other. That is, the whip arms 144 are positioned on the front of the delivery system 140 and the knobs 148 are positioned on the side of the delivery system. Accordingly, during a dental procedure, when a practitioner is using a particular handpiece, it may not be clear which knob is associated with the particular handpiece being used. Thus, if the practitioner wishes to adjust the flow rate of air or liquid to the handpiece being used, the practitioner may not be able to quickly identify which knob to adjust. This may cause the practitioner to adjust the wrong knob or to simply avoid adjusting the flow rate at all, thereby possibly not taking full advantage of the capabilities of the handpiece. Accordingly, indicator lights are associated with each of the flow control adjusters 148 as explained in further detail below.

Figure 4:
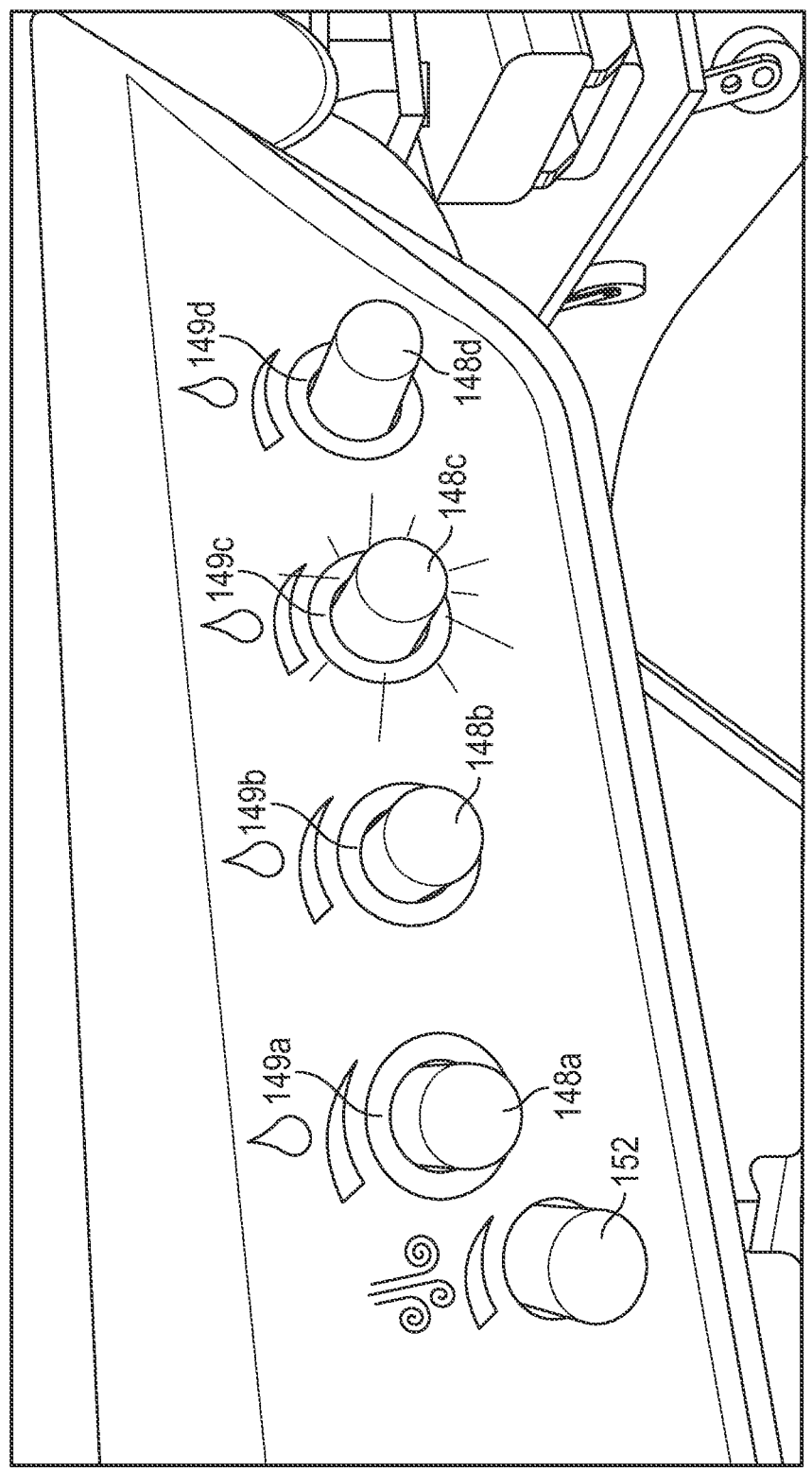
FIG. 4 shows an enlarged view of the flow control adjusters of FIG. 1.

FIG. 4 shows a close-up view of the flow control knobs 148a, 148b, 148c, 148d, and the air flow control knob 152. Each of the four flow control knobs can control fluid flow to one handpiece coupled to one of the whip arms 144. As also shown in FIG. 4, there are four indicators 149a, 149b, 149c, 149d that are associated with the flow control knob 148a, 148b, 148c, 148d, respectively. In the illustrated embodiment, the indicators 149a, 149b, 149c, 149d comprise indicator lights that can be illuminated to indicate a particular flow control knob. In other embodiments, the indicators can indicate a particular flow control knob through other means (e.g., sound, vibration, etc.). In the illustrated embodiment, each of the indicator lights is circularly shaped and encloses an associated flow control knob. In other embodiments, the indicator lights can have a different shape and can be positioned adjacent to an associated flow control knob. In the illustrated embodiment, the indicator lights comprise light-emitting diodes (LEDs). In other embodiments, the indicator lights can comprise other illumination sources. In some embodiments, light pipes can be used in conjunction with LEDs to distribute the illumination in a more visually pleasing fashion.

When a handpiece coupled to one of the whip arms 144 is being used and is pulled away from the delivery system 140, thereby causing the whip arm to pivot, the indicator light associated with the flow control adjuster that is associated with the handpiece being used is illuminated. This allows a practitioner to easily see which flow control knob controls the fluid flow rate to the particular handpiece being used. Thus, if the practitioner desires to adjust the fluid flow rate of the handpiece they are currently using, they need only look at the control knobs 148 and see which one is illuminated. For example, in FIGS. 3-4, indicator light 149c is illuminated. This means that flow control knob 148c can be used to adjust the fluid flow to the handpiece that is currently being utilized. Additional details of the operation of the indicator lights are discussed in further detail below.

The delivery system 140 can also comprise a touch interface control 146 connected to the control head 142. The touch interface control 146 can allow a practitioner to adjust various settings or features of the delivery system 140. In the illustrated embodiment, the touch interface control 146 comprises a display screen that can display information about the operation of the delivery system, such as which handpieces are connected, the flow rates being supplied to the various handpieces, and other related information. In particular embodiments, the touch interface control 146 can be connected to a database and can display patient information. In some embodiments, the touch interface control 146 can be a touchscreen that can allow a practitioner to enter information about a patient or to change control information related to the handpieces, such as fluid flow rates. In other embodiments, the touch interface control 146 can comprise one or more buttons, sliders, or other control inputs.

Figure 5:
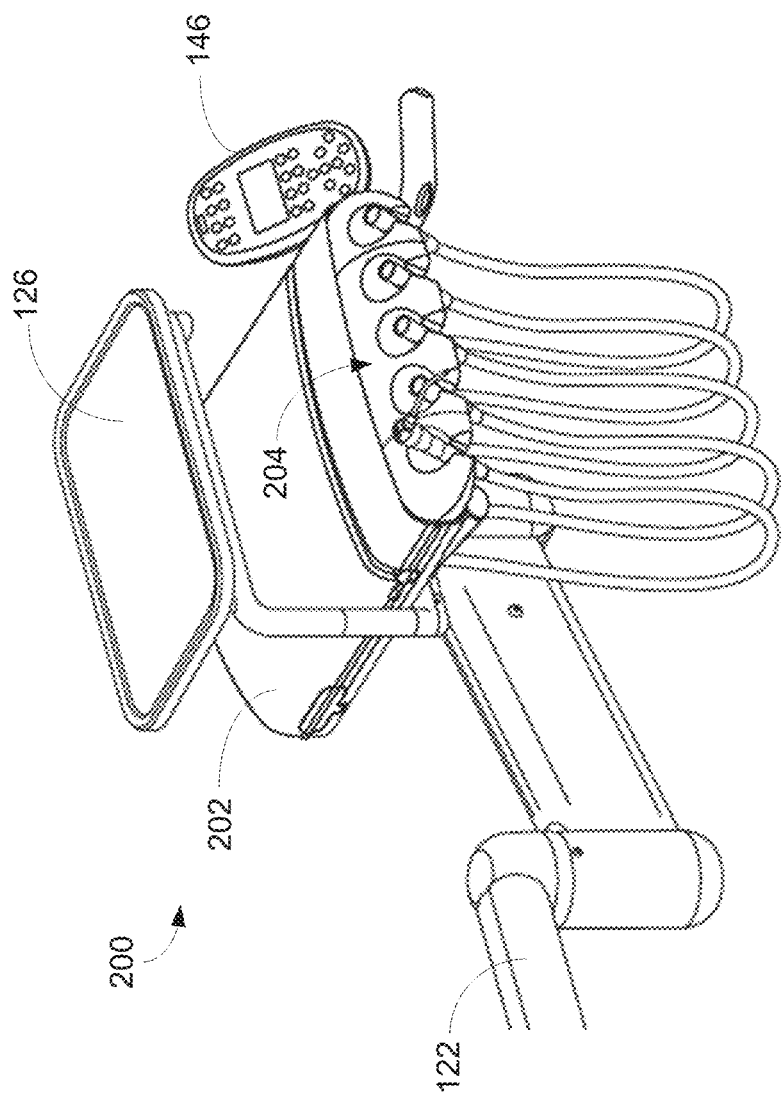
FIG. 5 shows a perspective view of a traditional dental unit.
Figure 6:
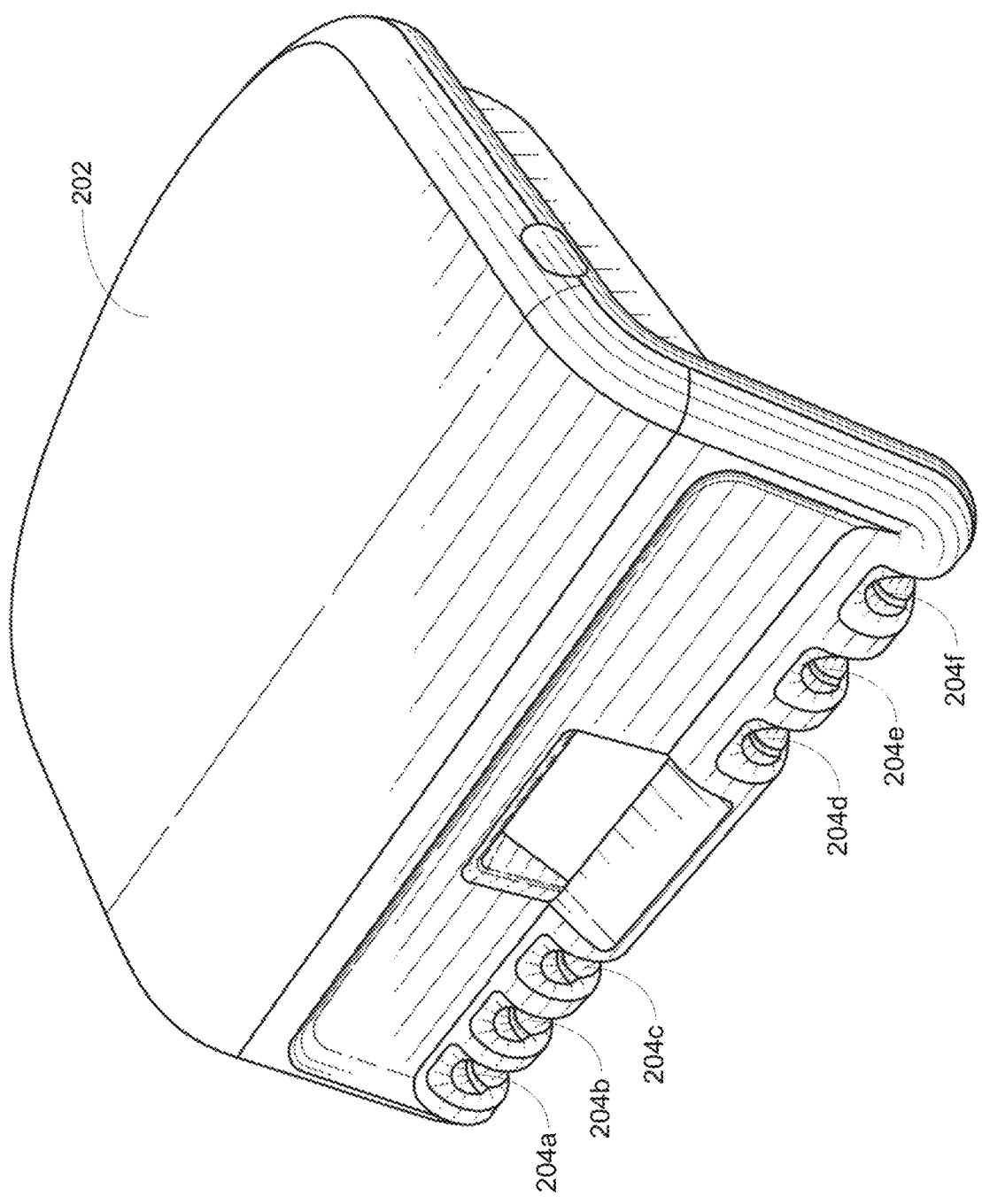
FIG. 6 shows a perspective view of another traditional control head with conduits and instruments not shown for clarity.

FIG. 5 shows an alternative embodiment of a dental treatment assembly that has a dental unit or delivery system 200 with a traditional control head 202 instead of the continental control head 142. The delivery system 200 is coupled to the arm 122 in a similar manner as shown in FIG. 1. The delivery system 200 includes the tray 126 and the touch interface control 146 as described above in connection with FIG. 1. However, the delivery system 200 does not include any whip arms. Instead, the control head 202 includes a plurality of holding areas 204 to hold various handpieces. As best shown in FIG. 6, the control head 202 of the illustrated embodiment includes six holding areas 204a-204f. In other embodiments, the control head 202 can have any number of holding areas.

The control head 202 can also have flow control adjusters similar to control flow knobs 148a-148d that can control fluid flow through one or more handpieces coupled to the control head 202. The control head 202 can also have indicator lights similar to indicator lights 149-149d associated with the control knobs. When not in use, handpieces can be placed in the holding areas 204. Whenever a handpiece is removed from a holding area, an indicator light associated with a control knob that is associated with that particular handpiece is indicated, e.g., by being illuminated. Thus, a practitioner can easily see which control knob can be used to adjust the flow rate for the particular hand piece being used during a procedure. The operation of the indicator lights is discussed in further detail below.

Figure 7:
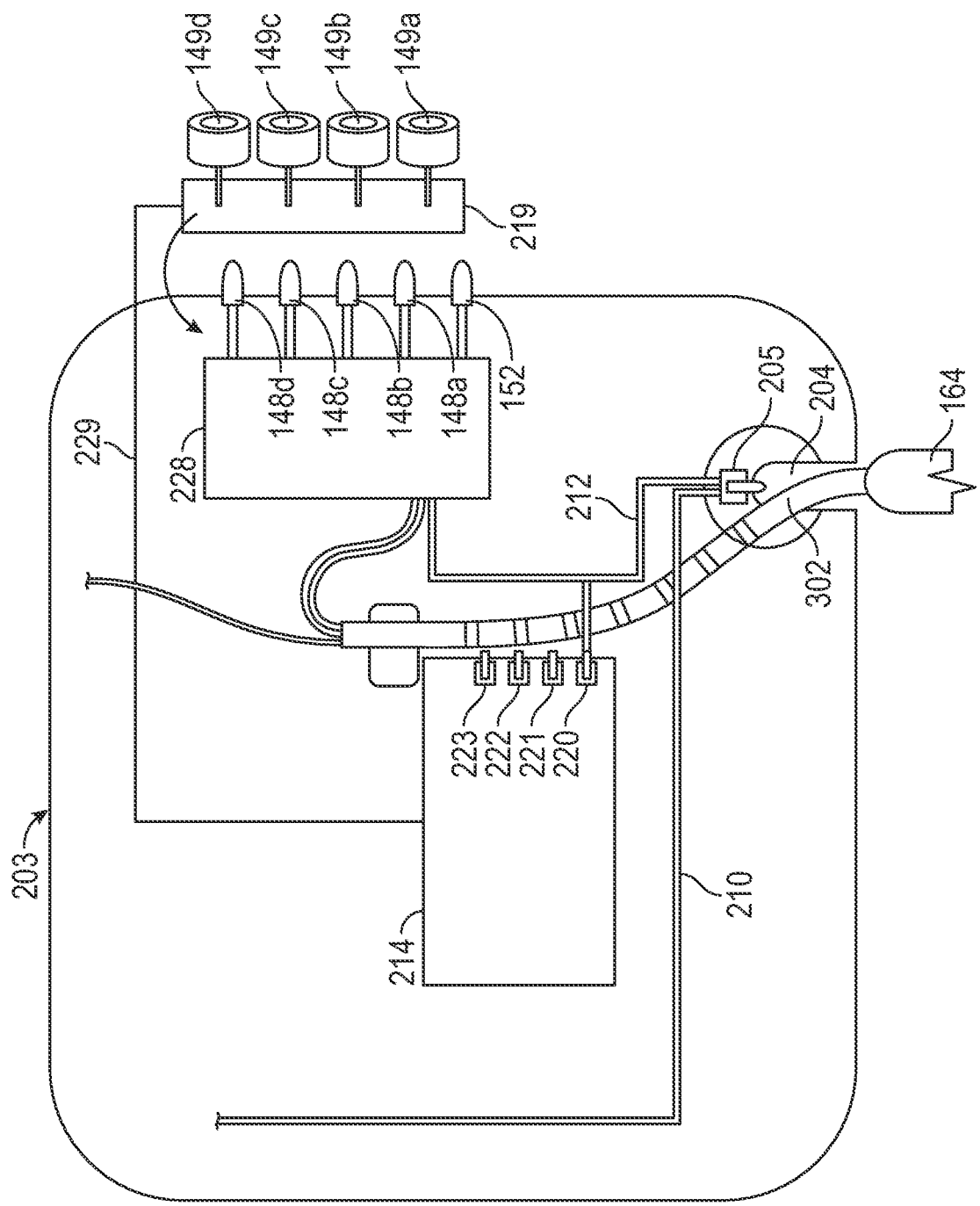
FIG. 7 shows a circuit diagram of the traditional control head of FIG. 6.

FIG. 7 shows a circuit diagram for a fluid and electrical circuit 203 in the interior of a control head similar to the control head 202. In the illustrated example of FIG. 7, only one holding area 204 is shown for purposes of illustration. A dental air/water syringe 164 is shown schematically in position in the holding area 204. Fluid can flow through conduit 302 to the handpiece 164. Within the holding area 204 is a pressure sensor (for example, a hangar valve or handpiece holder valve) 205 to detect whether a handpiece is present in the holding area. The handpiece holder valve 205 is one form of the sensor 304. In the illustrated embodiment, the handpiece holder valve 205 comprises a pneumatic valve and a latch 208, as shown in FIG. 8, and discussed below in greater detail.

Figure 8:
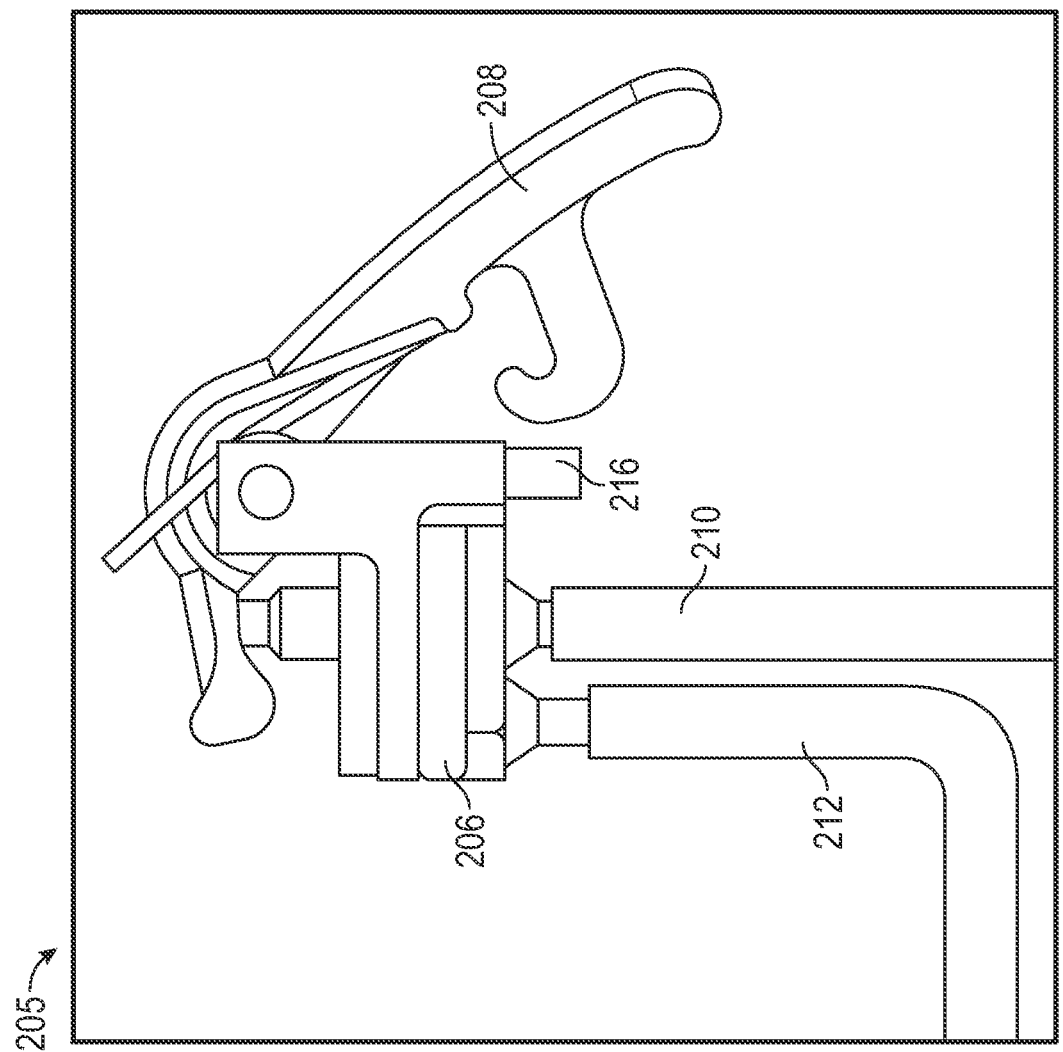
FIG. 8 shows the pneumatic valve of the traditional control head of FIG. 7.

As shown in FIG. 8, an air supply line 210 and a signal line 212 are connected to the pneumatic valve 206. The valve 206 also has a vent 216. A continuous feed of air at high pressure (about 80 psi) is supplied to the valve 206 through the air supply line 210, When a handpiece is placed within a holding area, the latch 208 causes the vent 216 to close and the valve 206 to open such that air is allowed to pressurize the air supply line 210 the signal line 212, and a circuit control board 214, as shown in FIG. 7. In some embodiments, when the valve 206 is opened, other components within the control head 202 or elsewhere can be pressurized as well. For example, the signal line 212 can be connected to a control block assembly 228, as shown in FIG. 7. The control block assembly 228 can perform a number of functions including enabling or disabling the flow of air, water, or other fluid flow to handpieces situated in their holding areas, opening or closing valves to turn a fluid flow on or off, or adjusting flow rates of fluids.

Figure 9:
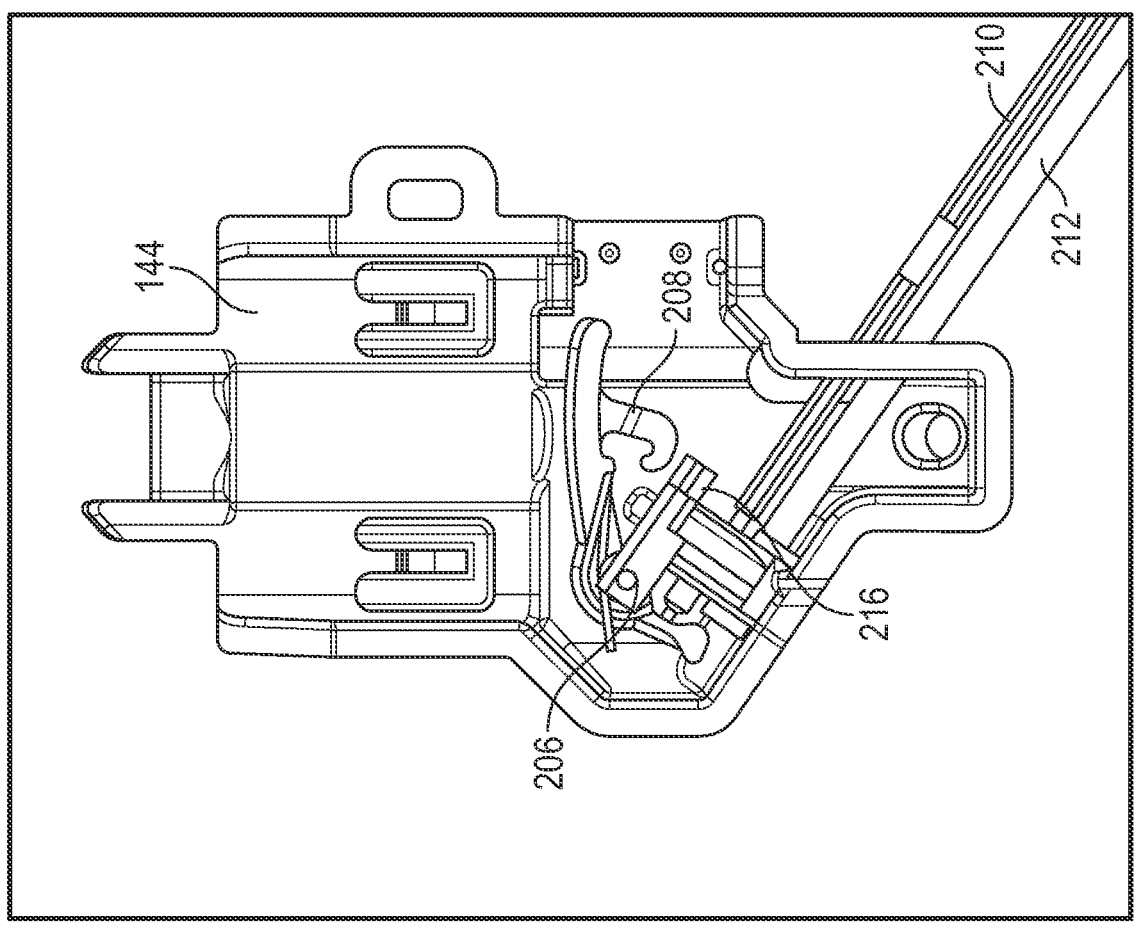
FIG. 9 shows a cross-sectional view of the pneumatic valve of the continental dental unit of FIG. 1.

A pressure transducer, i.e., one of the pressure transducers 220, 221, 222, 223 as best shown in FIG. 9, on the control board 214 converts the increased air pressure to an electrical signal that provides an input to an indicator controller circuit 219 by way of an electrical cable 229. In FIG. 7, the indicator controller circuit 219 is shown adjacent to the control adjusters 148a-d for purposes of illustration. In actuality, the controller circuit 219 can be positioned within the control block assembly 228.

In some embodiments, the control board 214 can disable certain functions of a handpiece situated in its holding area or other devices connected to the control board. In some embodiments, the control board 214 can send one or more signals to other devices to deactivate or disable certain functions of a handpiece situated in its holding area or certain functions of still other devices. The control board 214 can utilize either digital logic or software to drive the signals to indicator controller circuit 219 or other devices.

Each of the pressure transducers 220, 221, 222, 223 can be associated with one of the four indicators 149a, 149b, 149c, 149d. In other embodiments that have additional control knobs, the control board 214 can have additional pressure transducers. The pressure transducers 220, 221, 222, 223 can each output a signal to the indicator controller circuit 219 as described above. In some embodiments, the transducers 220, 221, 222, 223 can send a signal to other components on the control board 214 or other devices. When any of the pressure transducers 220, 221, 222, 223 send a signal associated with increased pressure to the indicator controller circuit 219, it means that the associated handpiece is not in use, causing the indicator light associated with the handpiece to not be illuminated.

When a handpiece is removed from a holding area, the latch 208 moves to an open position as shown in FIG. 8. This closes the valve 206 and opens the vent 216 such that the air supplied through the air supply line 210 is prevented from flowing through the valve 206 while also depressurizing the signal line 212 by way of the vent. When the corresponding pressure transducer on the control board 214 detects this reduced pressure, it sends a reduced pressure signal to the indicator controller circuit 219, which illuminates the indicator light associated with the handpiece that has been removed from the holding area. In some embodiments, the pressure transducers on the control board 214, the valve 206, the air supply line 210, the signal line 212, and/or the latch 208 can be replaced with an electric switch or sensor, such as a microswitch capacitive sensor, an inductive sensor, an infrared sensor, or an optical sensor. In these embodiments, the latch 208, or another presence sensor or device, can cause a signal to be activated when a handpiece is removed from a holding area.

In the embodiment disclosed above, the pressure in the signal line 212 is greater when the handpiece is in its holding area and lower when the handpiece is not in its holding area. One skilled in the art will appreciate that another embodiment can involve switching this arrangement, such that a reduced pressure in the signal line 212 occurs when the handpiece is in its holding area and an increased pressure is in the signal line occurs when the handpiece is not in its holding area by reconfiguring the handpiece holder valve 205. In this embodiment, the illumination of the indicators 149a, 149b, 149c, 149d would follow the same functionality described above, wherein the indicator associated with a handpiece removed from its holding area is illuminated, while all other indicators are not illuminated.

In some embodiments, the control board 214 can be configured to provide additional functionality. For example, if two or more handpieces are both removed from their respective holding areas, the control board 214 can be configured to help avoid confusion for the practitioner by not illuminating any of the indicators 149a, 149b, 149c, 149d.

FIG. 9 shows a cross sectional view of a lower portion of the whip arm 144 of the continental delivery system 140. Referring to FIG. 9, the pneumatic valve 206, described above, is positioned within the interior of the whip arm 144 and/or the housing near where the whip arm 144 extends from an upper surface of the housing. The latch 208 can open and close the valve 206 in the same manner as discussed above. The air supply line 210 supplies constant air pressure to the valve 206. When a whip arm is in a resting position, the latch 208 seals the vent 216 and air can flow from the air supply line 210 through the signal line 212 to the control board 214 in the same manner as described above with respect to the traditional delivery system. As described above, the pressure transducer can send a signal to the indicator controller circuit 219, which will not illuminate the indicator light associated with the whip arm.

When a whip arm 144 is pivoted, meaning that a handpiece coupled to that whip arm is being used, the latch 208 closes the valve 206 and uncovers the vent 216. This causes the signal to the pressure transducer on the control board 214 to be shut off, which in turn shuts off the signal to the indicator controller 219, which causes the appropriate indicator light to be illuminated to indicate which flow control knob can be used to control the handpiece being used.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A dental delivery system comprising:
    at least a first fluid conduit for supplying fluid via the delivery system to a handpiece connected to a distal end of the first fluid conduit;
    at least a first whip arm to which the first fluid conduit is coupled, wherein the first whip arm is movable and a first holding area for the first fluid conduit is defined with the first whip arm in an at rest position;
    a plurality of flow control adjusters positioned on the delivery system at a location remote from the first fluid conduit, wherein a first flow control adjuster of the plurality of flow control adjusters is operable to change a fluid flow rate in the first fluid conduit; and
    an indicator circuit comprising a plurality of sensors and a plurality of visual indicators, wherein each of the plurality of visual indicators is positioned adjacent a respective one of the plurality of flow control adjusters, wherein a first visual indicator is positioned adjacent the first flow control adjuster,
    wherein a first sensor of the plurality of sensors is operable positioned to contact the first whip arm when the first fluid conduit is in the first holding area, and wherein the first sensor is operable to change state upon predetermined movement of the first whip arm out of contact with the first sensor to trigger the first visual indicator adjacent the first flow control adjuster to visually indicate to a user that the first flow control adjuster is associated with the first fluid conduit.

2. The dental delivery system of claim 1, wherein the plurality of flow control adjusters comprises a plurality of rotatable knobs.

3. The dental delivery system of claim 1, wherein the first sensor comprises a pneumatic handpiece holder valve including a latch that contacts the first whip arm when the first fluid conduit is in the first holding position, and wherein the latch is configured to move and change a state of the pneumatic handpiece holder valve when the first whip arm is moved away from the pneumatic handpiece holder valve.

4. The dental delivery system of claim 3, wherein the indicator circuit further comprises a pressure transducer configured to receive a pneumatic signal from the pneumatic handpiece holder valve when the pneumatic handpiece holder valve changes state and to cause electrical power to turn on the first visual indicator.

5. The delivery system of claim 1, wherein the plurality of visual indicators comprises indicator lights, further comprising a control board configured to control illumination of the indicator lights, wherein the first sensor causes a signal to be sent to the control board to illuminate a first indicator light adjacent the first flow control adjuster when the first whip arm is moved out of contact with the first sensor.

6. The dental delivery system of claim 1, wherein the first visual indicator comprises at least one LED element positioned adjacent the first flow control adjuster.

7. The dental delivery system of claim 1, wherein the first visual indicator is configured as a ring-shaped illumination element at least partially surrounding the first flow control adjuster.

8. A dental delivery system comprising:
    at least a first fluid conduit for supplying fluid via the delivery system to a handpiece connected to a distal end of the first fluid conduit;
    a plurality of handpiece holders positioned at a front of the delivery system and including a first handpiece holder shaped to receive the first fluid conduit, the first handpiece holder having a first, sensor with a movable latch positioned to contact the first fluid conduit when the first fluid conduit is received in the first handpiece holder, and wherein the movable latch moves and causes the first sensor to change state when the first fluid conduit is removed from the first handpiece holder;
    a plurality of flow control adjusters positioned on a side of the delivery system remote from the plurality of handpiece holders on the front of the delivery system, wherein a first flow control adjuster of the plurality of flow control adjusters is operable to change a fluid flow rate in the first fluid conduit, wherein the plurality of flow control adjusters comprises a plurality of rotatable knobs; and
    an indicator circuit comptising a plurality of visual indicators corresponding to the plurality of flow control adjusters, respectively, wherein each of the plurality of visual indicators is positioned on the side of the delivery system adjacent a respective one of the plurality of flow control adjusters,
    wherein a first visual indicator of the plurality of visual indicators is connected via the indicator circuit to the first sensor, and wherein the first visual indicator, which is positioned on the side of the delivery system, is configured to be turned on to indicate the first flow control adjuster when the first sensor changes state to indicate to a user that the first fluid conduit, which is positioned at the front of the delivery system, has been removed from the first handpiece holder, thereby indicating that the first flow control adjuster corresponds to the first fluid conduit and can be adjusted to control flow of fluid through the handpiece connected to the first fluid conduit.

9. The dental delivery system of claim 8, wherein the plurality of visual indicators comprises a plurality of ring-shaped illumination elements surrounding the plurality of flow control adjusters, respectively.

\* \* \* \* \*

UNITED STATES PATENT AND TRADEMARK OFFICE
CERTIFICATE OF CORRECTION

| | | |
|---|---|---|
| PATENT NO. | : 11,185,389 B2 | Page 1 of 1 |
| APPLICATION NO. | : 16/387160 | |
| DATED | : November 30, 2021 | |
| INVENTOR(S) | : Williams et al. | |

It is certified that error appears in the above-identified patent and that said Letters Patent is hereby corrected as shown below:

In the Claims

Column 9, Line 41, Claim 1 "operable positioned to contact" should read --positioned to contact--.

Column 10, Line 24, Claim 8 "first, sensor" should read --first sensor--.

Signed and Sealed this
Seventeenth Day of May, 2022

Katherine Kelly Vidal
*Director of the United States Patent and Trademark Office*